(12) United States Patent
Bürger et al.

(10) Patent No.: US 11,660,740 B2
(45) Date of Patent: May 30, 2023

(54) FLOW RACK UNIT AND CONTROL SYSTEM FOR A FLOW RACK UNIT

(71) Applicant: SICK AG, Waldkirch/Breisgau (DE)

(72) Inventors: Jürgen Bürger, Teningen (DE); Matthias Opfolter, Denzlingen (DE)

(73) Assignee: SICK AG, Waldkirch/Breisgau (DE)

( * ) Notice: Subject to any disclaimer, the term of this patent is extended or adjusted under 35 U.S.C. 154(b) by 686 days.

(21) Appl. No.: 16/691,009

(22) Filed: Nov. 21, 2019

(65) Prior Publication Data
US 2020/0164500 A1 May 28, 2020

(30) Foreign Application Priority Data

Nov. 23, 2018 (EP) .................................... 18207947

(51) Int. Cl.
| | | |
|---|---|---|
| G07F 7/00 | (2006.01) | |
| B25H 3/04 | (2006.01) | |
| B65G 1/137 | (2006.01) | |
| G06Q 10/087 | (2023.01) | |
| G05B 19/418 | (2006.01) | |
| G06Q 50/28 | (2012.01) | |

(52) U.S. Cl.
CPC .............. *B25H 3/04* (2013.01); *B65G 1/137* (2013.01); *G06Q 10/087* (2013.01); *G05B 19/418* (2013.01); *G06Q 50/28* (2013.01)

(58) Field of Classification Search
CPC .. B25H 3/04; B65G 1/137; B65G 2203/0241; B65G 1/08; B65G 1/1371; G06Q 10/087; G06Q 50/28; G05B 19/418; G01B 11/026
USPC ......................................... 700/213–216, 223
See application file for complete search history.

(56) References Cited

U.S. PATENT DOCUMENTS

| | | | |
|---|---|---|---|
| 2011/0144798 A1* | 6/2011 | Freudelsperger | B65G 1/08 700/218 |
| 2011/0295417 A1* | 12/2011 | Smith, III | G07F 9/002 700/235 |

(Continued)

FOREIGN PATENT DOCUMENTS

| | | |
|---|---|---|
| BE | 1023861 B1 | 8/2017 |
| DE | 102016108582 B3 | 7/2017 |

OTHER PUBLICATIONS

Extended European Search Report dated Jan. 7, 2019 corresponding to application No. 18207947.5-1022.

*Primary Examiner* — Yolanda R Cumbess
(74) *Attorney, Agent, or Firm* — Nath, Goldberg & Meyer; Jerald L. Meyer

(57) ABSTRACT

A flow rack unit for providing stock material units includes at least two rack bays and one control system. Each rack bay has a removal side and a storage side opposite the removal side and is configured to provide the stock material units in a respective bay level arranged next to one another starting in the direction of the storage side. A respective sensor arrangement of the control system is associated with each rack bay. Each sensor arrangement is arranged at the storage side of the associated rack bay and connected to a control unit of the control system via a common data line. The sensor arrangements each include an occupancy sensor configured as a distance sensor. Each occupancy sensor has a measurement zone that is aligned to measure a distance from a rearmost stock material unit stored in the associated rack bay and disposed closest to the occupancy sensor.

20 Claims, 7 Drawing Sheets

(56) References Cited

U.S. PATENT DOCUMENTS

| | | | |
|---|---|---|---|
| 2013/0253697 A1* | 9/2013 | Issing | G06Q 10/087 |
| | | | 700/214 |
| 2016/0048798 A1* | 2/2016 | Meyer | G01G 19/42 |
| | | | 705/28 |
| 2017/0327312 A1* | 11/2017 | Hoehler | G05B 19/418 |
| 2018/0165711 A1* | 6/2018 | Montemayor | G06Q 30/0255 |
| 2018/0225625 A1* | 8/2018 | DiFatta | G06Q 10/087 |
| 2019/0150639 A1* | 5/2019 | Wittig | A47B 88/969 |
| 2019/0339923 A1* | 11/2019 | Nel | G06Q 10/087 |

\* cited by examiner

FLOW RACK UNIT AND CONTROL SYSTEM FOR A FLOW RACK UNIT

FIELD

The present invention relates to a flow rack unit and to a control system for a flow rack unit.

BACKGROUND

Flow rack units inter alia serve the provision of stock material in production processes, installation processes, or logistics processes. As a rule, they have a plurality of rack bays arranged above one another and/or next to one another. The rack bays are filled with the stock material on a loading side and the stock material is removed from the rack bays on a removal side disposed opposite the loading side in the longitudinal direction. The stock material can be arranged in the rack bays as predefined stock material units, for example in standardized containers.

Such flow rack units are inter alia used for stockkeeping in accordance with the so-called KANBAN principle. In this process, a predefined minimum amount of stock material is stored directly at the place of consumption in flow rack units. If the minimum amount is fallen below, this is detected and a corresponding refill process is triggered. A unique code is here associated with every kind of stock material for identification and is typically directly affixed to the stock material units.

Automated sensor systems can be used to detect the stock material present in a flow rack unit. The sensor systems are as a rule connected to a control system via which the required refill processes can be triggered and controlled in an automated manner. As a rule, different kinds of stock material to be refilled are combined and delivered in a batch associated with the flow rack unit in the refilling process. The stock material is then associated with the individual rack bays at the flow rack unit.

A flow rack unit having a sensor system for inventory monitoring of the individual rack bays of a flow rack unit is known from document DE 10 2016 108 582 B3. Here, a sensor is respectively associated with the individual storage positions of the rack bays and the sensors of a rack bay are connected via individual lines to a bay control unit associated with the respective rack bay.

Depending on the underlying process, it may be necessary to alter the flow rack units at regular intervals to adapt them to changes of the process. The process can, for example, change in that additional stock material has to be provided or in that the workpieces to be installed are changed. On an alteration a division of the rack bays and/or a size of the stock material units to be stored can inter alia be changed. As a rule, the sensor system for detecting the inventory of stock material here has to be adapted in a laborious manner to the changed rack division.

SUMMARY

It is the object of the invention to provide a flow rack unit and a control system for a flow rack unit such that the inventory of stored stock material can be detected in a simple and inexpensive manner.

This object is satisfied by a flow rack unit and by a control system for a flow rack unit in accordance with the independent claims. Further developments are specified in dependent claims.

A flow rack unit in accordance with the invention for providing stock material units comprises at least two rack bays and one control system. The rack bays each have a removal side and a storage side disposed opposite the removal side and are configured to provide the stock material units in a respective bay level arranged next to one another in the direction of the storage side starting from the removal side. A respective sensor arrangement of the control system Is associated with each rack bay. The sensor arrangements are here each arranged at the storage side of the associated rack bay and are connected to a control unit of the control system via a common data line. The sensor arrangements each comprise an occupancy sensor configured as a distance sensor. Each occupancy sensor has a measurement zone that Is aligned from the storage side of the associated rack bay in the direction of the removal side of the associated rack bay to measure a distance from a rearmost stock material unit stored in the associated rack bay and disposed closest to the occupancy sensor. Each occupancy sensor is configured to transmit distance data representing the measured distance via the data line to the control unit to detect a number of stock material units stored in the rack bays in the control unit. Each sensor arrangement is configured to detect a placing of a stock material unit to be placed at the storage side of the associated rack bay and to transmit load sensor data indicating the placement via the data line to the control unit.

It has been recognized within the framework of the invention that it is sufficient for the detection of the inventory of stock material units stored in the individual rack bays to provide a single distance sensor per rack bay that measures the distance from the storage side up to the rearmost stock material unit. A sensor thus no longer has to be present for every placed stock material unit, but rather only one sensor per rack bay has to be present and the number of required sensors is particularly small. The control system can also be adapted to a changed configuration of the rack bays on an alteration of the flow rack unit in that a control program for calculating the number of stored stock material units stored in the control unit is adapted purely on the software side. An alteration or a rearrangement of the occupancy sensors is then not necessary as a rule.

A rack equipped with a flow rack unit in accordance with the invention can naturally additionally also comprise rack units, for instance flow rack units, or rack bays that are conventionally configured. Such conventionally configured rack units or rack bays can, for example, be configured without a link to the control system or without the occupancy sensors. Only that part of the rack is then considered a flow rack unit in accordance with the invention that has the features in accordance with the invention. To this extent, the invention also comprises a rack system having a flow rack unit in accordance with the invention.

The occupancy sensors can be arranged above, below, or to the side of the rack bays or of the rack levels of the rack bays. The occupancy sensors can be configured to determine the distances optically, for instance in accordance with the time of flight (TOF) principle. The occupancy sensors can be configured to emit an optical measurement signal into the measurement zone and to receive a portion of the measurement signal reflected by the rearmost stock material unit to determine the distance. For example, the occupancy sensors can determine the distance from a transit time of the measurement signal transmitted as a pulsed signal or from a phase shift between the transmitted and received measurement signal. The measurement zones of the occupancy sensors can be configured as dot-shaped or as conical with a circular or oval base surface. The measurement zones of the occupancy sensors can, however, also be linear.

The sensor arrangements of the control system can each comprise a load sensor for detecting the placement of the stock material unit to be placed. The load sensors can each be configured as separate sensors and can be connected to the data line. The load sensors and the occupancy sensors can be connected to the data line in series. The load sensor and the occupancy sensor that are associated with a common rack bay can in particular each be connected to the data line in series.

The occupancy sensors can be configured as proximity sensors or as light sensors, preferably as reflection light sensors. Measurement zones of the load sensors can each be substantially aligned perpendicular to the rack level of the respective rack bay. The occupancy sensors can each be arranged below, above, or to the side of the rack level of the associated rack bay.

The sensor arrangement of one of the rack bays or the sensor arrangements of a plurality or of all rack bays can also be configured to detect the placement of the stock material unit to be placed by means of the occupancy sensors. In this respect, the measurement zones of the respective occupancy sensors can be aligned such that they also detect placement zones of the rack bays arranged at the storage side. The placement of the stock material unit is then detected in that the stock material unit is detected by the associated occupancy sensor within the placement zone. The occupancy sensor is then configured to generate load sensor data indicating the placement of the stock material unit and to transmit them to the control unit.

The flow rack unit can also have both rack bays whose sensor arrangements comprise the occupancy sensor and the load sensor and rack bays whose sensor arrangements only comprise the occupancy sensor and in which the placement of the stock material unit is detected by the occupancy sensor. Embodiments of the control system will primarily be described in the following in which the sensor arrangement comprises the additional load sensor. The following statements, however, also apply analogously to embodiments in which the placement of the stock material unit is detected by means of the occupancy sensor.

The control unit, for example the control program stored in the control unit, can calculate the number of stored stock material units in that an occupancy length of the rack bay over which the rack bay is occupied by stock material units is calculated from the distance and from a total length of the respective rack bay stored in the control unit and the occupancy length is divided by a length of the stock material units stored in the control unit. The total length of the respective rack bay can, for example, be a length between the occupancy sensor and a front edge arranged at the removal side, for example an abutment arranged at the reception side. The individual rack bays of the flow rack unit can all have the same length, for instance the same total length. The individual rack bays can, however, also have different lengths, for instance different total lengths, and the respective length, for example the respective total length, can be stored for each rack bay in the control unit.

The data line can be configured as a network link, for example as a fieldbus. The sensors of the sensor arrangement, in particular the occupancy sensors, can be connected to the data line in parallel and/or in series. Since the sensors are connected to a common data line, the sensors and the control unit of the control system can be connected to one another by cables in a particularly simple manner.

The occupancy sensors and the optionally present load sensors form communication participators connected to the data line. The control system can comprise a master module that automatically assigns a communication address to the communication participants connected to the data line. The address can be assigned to the communication participants, for example, on the basis of a position at which they are connected to the data line. If the communication participants are connected to the data line in series, the addresses can be assigned to the communication participants in the order in which they are connected to the data line. The assignment of the addresses can take place, for example, in an automated manner during an initialization process of the control system or of a communication system comprising the data line and the communication participants.

The control system can be configured to control a loading of the flow rack unit with the stock material units using the load sensor data and, for example, to implement a worker guidance. During the worker guidance, operating staff who fill the rack bays with the stock material units at the storage side can be advised via display units of the rack bay into which the stock material unit to be placed is to be placed. The load sensor data can then be used to verify the placement of the stock material unit in the correct rack bay.

It can, for example, be made known to the control system, for instance using a code affixed to the stock material unit and read into the control system which rack bay the stock material unit is to be placed in. It can then be recognized with reference to the load sensor data whether the stock material unit to be inserted is or has been actually placed into the intended rack bay. The control system can furthermore be configured to indicate an incorrect insertion of stock material units, for example by means of optical and/or acoustic feedback. The detection of the placement of the stock material unit and the arrangement of the load sensor at the storage side of the rack bays makes it possible already to recognize during the placement of the stock material unit or directly after the placement of the stock material unit which rack bay the stock material to be placed is placed in. An incorrect placement can thereby be indicated as long as the stock material unit is still at the storage side and it can still be removed from the incorrect rack bay in a simple manner.

The control system can furthermore be configured to ensure as part of an automated filling of the flow rack unit that stock material units required at the flow rack unit are provided as required. The control unit can be connected to an inventory control in a guide plane of the control system for this purpose. For example, stock material units can be provided for one or more of the rack bays when the number of the stock material units stored in the respective rack bays falls below a predefined threshold value stored in the control unit. In this respect, a common threshold value can be predefined for all or for a plurality of the rack bays; but a separate threshold value can also be predefined for every rack bay.

The flow rack can be configured to move the stock material units after the placement in an automated manner from the storage side to the removal side. For example, the rack bays of the flow rack can be arranged in a manner inclined in the longitudinal direction from the storage side to the removal side and the stock material units can move in a supported manner in the rack bays on rotatable transport means, for instance rollers or rolls, to the removal side. The rack bays can also comprise driven transport means, for instance rollers, rolls, or conveyor belts, to move the stock material units in a driven manner from the storage side to the removal side. The flow rack is configured such that the stock material units accumulate one another the other at the removal side of the rack bays after the placement.

In a further development of the flow rack unit, the sensor arrangements are connected in series via the data line. All the sensors of the sensor arrangements are preferably connected to the data line in series. The occupancy sensors and the optionally present load sensors can in particular be connected in series to the data line. The sensors can thereby be particularly easily connected to the control unit. A simple addressing of the sensors via their positions at the data line is also possible.

In a further development of the flow rack unit, the occupancy sensors are configured to measure the distances by means of the time of flight principle. This enables a simple, but nevertheless precise, determination of the distances.

In a further development of the flow rack unit, a respective display unit is associated with the rack bays and the control unit is configured to transmit control data for the display units via the data line to characterize one of the rack bays as a destination rack bay for the stock material unit to be placed. This enables a particularly simple worker guidance.

A respective associated display unit can be provided for each rack bay. The display units can each be arranged at the storage side of the rack bay, for example above or below the bay level of the rack bays. The display units can, however, also be combined in a central display associated with the flow rack unit. The central display can, for example, be configured as a display or the like.

The display units can each comprise one or more lamps, preferably one or more colored lamps. The display units can, for example, be configured to emit a first light signal, for instance a green light signal, to mark the associated rack bay as the destination rack bay. The display units can furthermore be configured to indicate the placement of the stock material unit to be placed into an incorrect rack bay differing from the destination rack bay by a second light signal, for instance a red light signal. The control data can, for example, represent the light signal to be indicated.

In a further development of the flow rack unit, the control system has an identification unit that is configured to detect a code of the stock material unit to be placed and to transmit it to the control unit, with the control unit being configured to determine a destination rack bay for the stock material unit to be placed with reference to the code. The destination rack bay can thereby be determined in a simple manner.

The identification unit can, for example, be configured as a barcode reader, an RFID scanner, or as a camera and can be connected to the control unit via a communication line. The communication line can be separate from the data line used to connect the occupancy sensors and the optionally present load sensors. The communication line can, however, also be designed via said data line.

Association data can be stored in the control unit, with the associated rack bay being stored in the association data for every code of the stock material units. The association data can, for example, be stored as a table.

In a further development of the flow rack unit, the sensor arrangements each comprise the load sensor that is configured to detect the placement of the stock material unit to be placed at the storage side of the associated rack bay. The load sensors and the occupancy sensors are connected, preferably in series, to the common data line.

In a further development of the flow rack unit, the occupancy sensors and the load sensors of the individual rack bays are each connected to the data line before or after the occupancy sensors and the load sensors of adjacent rack bays. This makes it possible to connect the occupancy sensor and the load sensor, that are associated with a common rack bay, via short sections of the data line and thus particularly simply.

If the control system additionally comprises a respective associated display unit for each rack bay, the occupancy sensors, the load sensors, and the display units of the individual rack bays can also each be connected to the data line before or after the occupancy sensors, the load sensors, and the display units of adjacent rack bays. The sensors associated with one of the rack bays and optionally the display unit associated with the rack bay can in particular be connected to the data line next to one another.

In a further development of the flow rack unit, the occupancy sensors and the load sensors of the individual rack bays are each arranged at a common holder. This makes it possible to install or to adjust sensors associated with one of the rack bays in a simple manner. The associated occupancy sensors and the associated load sensor can each be arranged at the holders such that a measurement axis of the measurement zone of the occupancy sensor is aligned at a predefined angle, preferably substantially perpendicular, particularly preferably perpendicular to a measurement axis of a measurement zone of the load sensor. The holders can each comprise adjustment elements by means of which the holders can be positioned and aligned at the rack bays. For example, the adjustment elements can be configured to carry out a rotation of the holders about a pivot axis or transverse axis aligned in parallel with the rack level and perpendicular to a longitudinal direction of the rack bay.

In a further development of the flow rack unit, the holders are each configured as bent sheet metal parts. Such bent sheet metal parts can be produced particularly simply and inexpensively. Each bent sheet metal part can form a respective alignment element for the occupancy sensor arranged at the respective bent sheet metal part and for the load sensor arranged at the respective bent sheet metal part. The holders can each have a load sensor mount for the load sensor and an occupancy sensor mount for the occupancy sensor, with the load sensor mount and the occupancy sensor mount being respectively formed at the one-part bent sheet metal part of the respective holder.

In a further development of the flow rack unit, the occupancy sensors of the individual rack bays are each arranged below the bay level of the respective rack bay and the measurement zones of the occupancy sensors respectively intersect the rack levels of the rack bays between the storage side and the removal side. The distances from the respective rearmost stock material units can then be determined between the removal sides and longitudinal positions of intersections between the measurement zones and the rack levels.

In a further development of the flow rack unit, the measurement zones of the occupancy sensors of the individual rack bays are formed in a linear manner in a vertical direction oriented perpendicular to the rack level of the respective rack bay. The rearmost stock material unit can thereby be detected over a particularly large zone. The occupancy sensors can comprise an optics units that is configured to linearly expand a measurement signal used to determine the distances. The measurement signal can, for example, be transmitted as electromagnetic radiation, for instance as light radiation or as laser radiation. The optics unit can be formed as a cylinder lens or as a lens array. The measurement zones of the occupancy sensors can also be formed linearly in that the optics units are configured to deflect the measurement signals along the vertical direction and to scan the measurement zones in the vertical direction during the measurements of the distances.

In a further development of the flow rack unit, the occupancy sensors are each configured to transmit a minimal distance value measured along the vertical direction as the respective measured distance. On a measurement in accordance with the time of flight principle, the minimal distance value can, for example, be determined in that a time of flight is determined that elapses between the transmission of the measurement signal and the first reception of the reflected measurement signal.

In a further development of the flow rack unit, a first length of first stock material units and a second length of second stock material units are stored in the control unit. The control unit is configured to take account of the first length or of the second length in dependence on an identification signal supplied to the control unit for identifying the stock material unit to be placed in the determination of the distances. The control unit can thereby also determine the number of material units stored in one of the rack bays when stock material units of different lengths are stored. More than two lengths can naturally also be stored or taken into account in this manner.

Length information can be stored in the control unit, with the length information respectively comprising the associated length of the respective stock material unit, in particular the first length and the second length, for every possible identification signal. The code of the respective stock material unit is preferably supplied to the control unit as the identification signal, for example from the identification unit connected to the control unit. In addition to the first length and to the second length, a plurality of additional lengths of further stock material units can also be stored in the control unit.

In a further development of the flow rack unit, the control system comprises a monitoring unit and the monitoring unit is connected to the sensor arrangements via the data line. The monitoring unit is connected to the control unit via a further data line and comprises a master module for controlling a data transmission over the data line. The sensor arrangements are connected to the data line as slave units controlled by the master module. The monitoring unit can in particular be connected to the occupancy sensors and to the optionally present load sensors via the data line and the occupancy sensors and the optionally present load sensors can be connected to the data line as slave units controlled by the master module.

The distance data that are determined by the occupancy sensor connected to the data line and the load sensor data that are determined by the load sensors or occupancy sensors connected to the data line can be collected in the monitoring unit and be provided for invoking by the control unit. The monitoring unit can be configured to invoke the distance data and the load sensor data independently of the control unit at the occupancy sensors and optionally at the load sensors. If the control system comprises display units, the display units can also each be connected to the data line as slave units controlled by the master module. The monitoring unit can be configured to receive the control data for the display units in collected form from the control unit and subsequently to forward them addressed to the individual display units via the data line.

Communication between the monitoring unit, the optionally present load sensors, the occupancy sensors, and optionally the display units via the data line can take place in accordance with the master-slave principle and can be controlled by the master module. The monitoring unit having the master module can be arranged at a start of the data line so that the data line is guided, starting from the master module, to the occupancy sensors and optionally to the load sensors, and/or display units.

The further data line can likewise be configured as a fieldbus. A communication protocol used on the further data line can correspond to a communication protocol used on the data line. The communication protocol used on the further data line can, however, also differ from a communication protocol used on the data line.

Alternative embodiments of the flow rack unit can also be configured without the monitoring unit. In this case, the master module can, for example, be arranged in the control unit and the control unit can be directly connected to the data line. The monitoring unit can alternatively also be arranged in one of the occupancy sensors or in one of the load sensors so that, for example, a first one of the load sensors or a first one of the occupancy sensors additionally comprises the master module.

The invention further relates to a control system for a flow rack unit for providing stock material units in at least two rack bays, having at least two sensor arrangements and one control unit, with the sensor arrangements connected to the control unit via a common data line, and the sensor arrangements each comprise an occupancy sensor configured as a distance sensor. The occupancy sensors are configured to be respectively associated with one of the rack bays and to be arranged at a storage side of the associated rack bay such that a measurement zone of the respective occupancy sensor is aligned from the storage side of the rack bay in the direction of a removal side of the rack bay disposed opposite the storage side to measure a distance from a rearmost stock material unit stored in the associated rack bay and closest to the occupancy sensor. Each occupancy sensor is configured to transmit distance data representing the measured distance via the data line to the control unit to detect a number of stock material units stored in the rack bays in the control unit, and is configured to detect a placement of a stock material unit to be placed at the storage side of the associated rack bay and to transmit load sensor data indicating the placement via the data line to the control unit.

Such a control system can be used as the control system of the flow rack unit in accordance with the invention. Advantages and further developments that have been described in connection with the flow rack unit each also relate to the control system in accordance with the invention.

The invention further relates to a use of at least two distance sensors as occupancy sensors of a control system for a flow rack unit providing stock material units in at least two rack bays. The distance sensors are each associated with one of the rack bays and are arranged at a storage side of the associated rack bay such that measurement zones of the distance sensors are aligned from the storage side of the associated rack bay in the direction of a removal side of the associated rack bay disposed opposite the storage side. A respective distance from a rearmost stock material unit stored in the rack bay associated with the respective distance sensor and disposed closest to the respective distance sensor is measured by means of the distance sensors. The distance sensors are connected to a control unit of the control system via a common data line, with the distance data representing the measured distances being transmitted via the data line from the distance sensors to the control unit to detect a number of stock material units arranged in the rack bays in the control unit. Load sensor data are transmitted via the data line from the load sensors to the control unit to control a placement of the stock material units into the rack bays.

The at least two distance sensors can in particular be used as occupancy sensors for the control system in accordance with the invention or as occupancy sensors for the flow rack unit in accordance with the invention. To this extent, the advantages and further developments described in connection with the flow rack unit and the control system also relate to the use in accordance with the invention of the distance sensors as occupancy sensors.

BRIEF DESCRIPTION OF THE DRAWINGS

The invention will be explained in the following with reference to Figures. There are shown in a schematic representation in each case.

DETAILED DESCRIPTION

Figure 1:
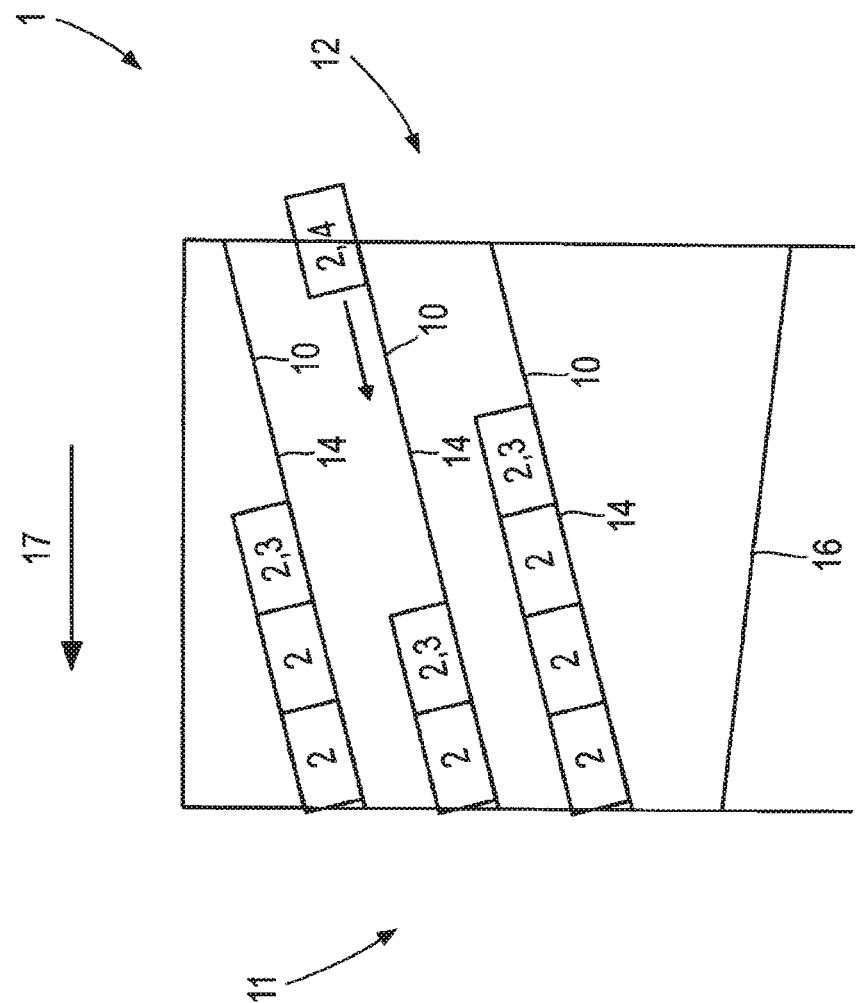
FIG. 1 a flow rack unit.

FIG. 1 shows a flow rack unit 1 having three rack bays 10 arranged (above one another here). The rack bays 10 are inclined in a longitudinal direction 17 extending from a storage side 12 to a removal side 11 of the rack bays 10. Stock material units 2 are provided in the rack bays 10 in the direction of the storage side 12, starting from the removal side 11. Beneath the rack bays 10, the flow rack unit 1 comprises a return bay 16 that is inclined against the longitudinal direction 17 and serves to return the stock material units 2 from the removal side 11 to the storage side 12. The flow rack unit 1 can comprise further rack bays above or next to the shown rack bays 10, said further rack bays being configured as has been described for the rack bays 10.

In each rack bay 10, that stock material unit 2 that is arranged closest to the storage side 12 in the longitudinal direction 17 forms a rearmost stock material unit 3. A topmost rack bay 10 of the flow rack unit 1 in the occupancy state shown includes a total of two stock material units 2 between the removal side 11 and the rearmost stock material unit 3; a middle rack bay 10 includes a stock material unit 2 between the removal side 11 and the rearmost stock material unit 3; and a bottommost rack bay 10 includes a total of three stock material units 2 between the removal side 11 and the rearmost stock material unit 3.

Figure 2:
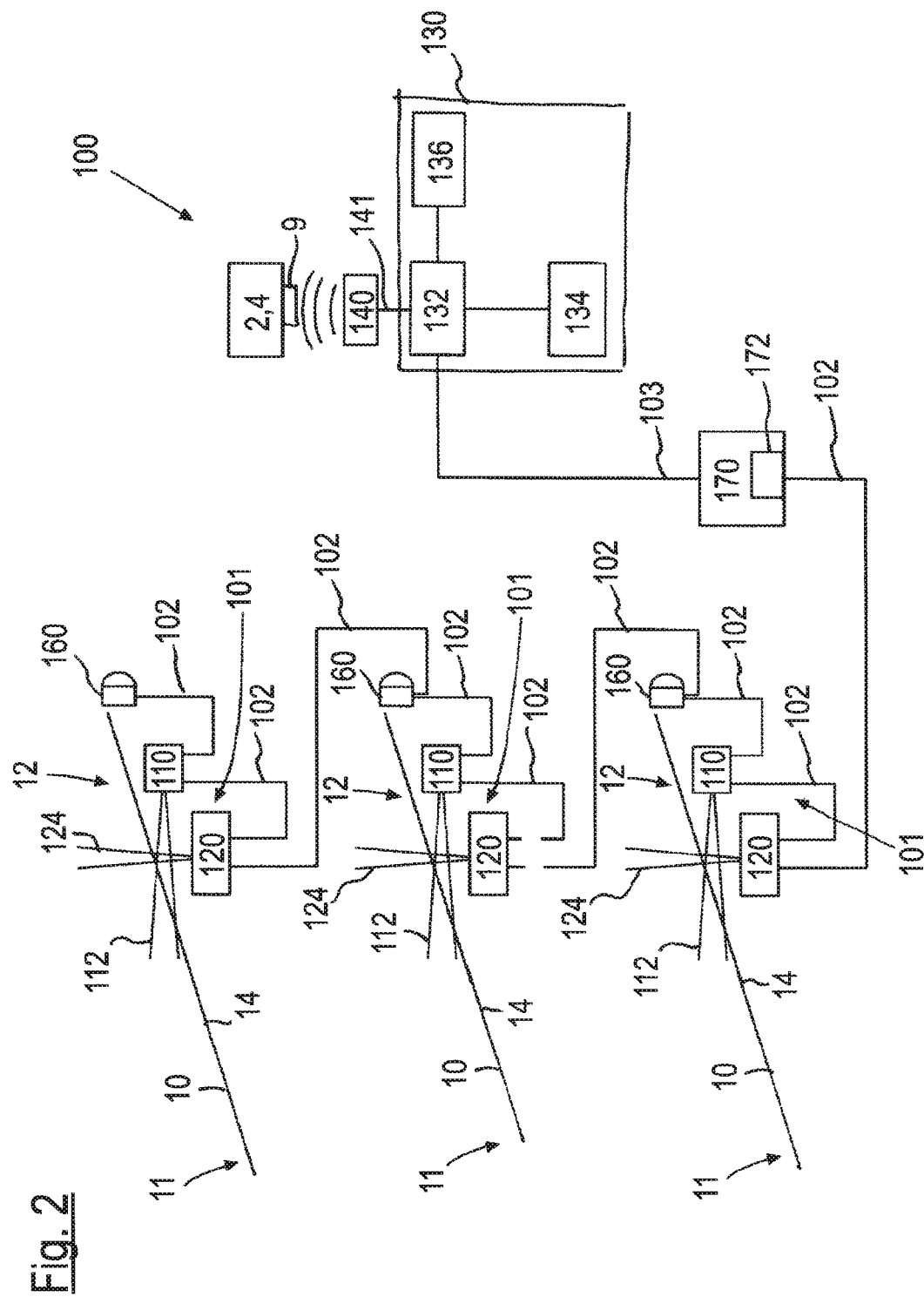
FIG. 2 a control system for the flow rack unit.

FIG. 2 shows a control system 100 for the flow rack unit 1. The control system 100 comprises sensor arrangements 101 and display units 160, with a respective one of the sensor arrangements 101 and one of the display units 160 being associated with each rack bay 10. The sensor arrangements 101 each comprise an occupancy sensor 110 and a load sensor 120. The occupancy sensors 110, the load sensors 120, and the display units 160 are each arranged at the storage side 12 of the associated rack bay 10. The occupancy sensors 110 have a measurement zone 112 and the load sensors 120 have a measurement zone 124. The occupancy sensors 110 and the load sensors 120 are each arranged below a rack level 14 of the associated rack bay 10.

The occupancy sensors 110, the load sensors 120, and the display units 160 are connected via a data line 102 to a monitoring unit 170 and to a control unit 130 of the control system 100. The occupancy sensors 110, the load sensors 120, and the display units 160 are connected in series to the data line 102 and the monitoring unit 170 is arranged at a start of the data line 102. The monitoring unit 170 comprises a master module 172 via which the monitoring unit 170 is connected to the data line 102.

The occupancy sensors 110, the load sensors 120, the display units 160, and the monitoring unit 170 form communication participants connected to the data line 102. As is shown in FIG. 2, the data line 102 comprises respective line segments that extend between adjacent communication participants.

The monitoring unit 170 is connected to the control unit 130 via a further data line 103 so that the communication participants of the control system 100 connected to the data line 102 are connected to the control unit 130 via the data line 102, the monitoring unit 170, and the further data line 103. The control unit 130 comprises a processing unit 132 that can be configured as a logics unit, for example a microprocessor, a microcontroller, an ASIC, or an FPGA.

An identification unit 140 is connected via a communication line 141 to the control unit 130, preferably to the processing unit 132. The identification unit 140 is configured to detect a code 9 affixed to a stock material unit 4 to be placed and to transmit the code 9 to the control unit 130, in particular to the processing unit 132. The code 9 can be configured as an RFID tag, a barcode, a numerical sequence, or the like.

Association data 136 are stored in the control unit 130 that associate a destination rack bay for the stock material unit 4 to be placed with the read code 9. Length information 134 is furthermore stored in the control unit 130 that associates a length of the stock material unit 4 to be placed with the read code 9. The association data 136 can in particular associate a first destination rack bay with a first code of first stock material units and a second destination rack bay differing from the first destination rack bay with a second code of second stock material units differing from the first code. Alternatively or additionally, the length information 134 can associate a first length with the first code and a second length differing from the first length with the second code.

A control of the loading of the flow rack unit 1 by the control system 100 comprises a detection of the code 9 by the identification unit 140 and a transmission of the code 9 to the control unit 130. The control further comprises a determination of the destination rack bay using the transmitted code 9 and a marking of the destination rack bay by means of the display unit 160 associated with the destination rack bay. For this purpose, control data for the associated display unit 160 are transmitted via the monitoring unit 170 and the data line 102 to transmit a first light signal by the display unit 160 and thereby to mark the destination rack bay.

If the stock material unit 4 to be placed is placed into the destination rack bay, this is detected by the load sensor 120. The control then comprises transmitting corresponding load sensor data from the load sensor 120 to the control unit 130. The control subsequently comprises a transmission of further control data from the control unit 130 to the display unit 160 of the destination rack bay to end the transmission of the first light signal.

If the stock material unit 4 to be placed is placed into an incorrect rack bay 10 not corresponding to the destination rack bay, this is detected by the load sensor 120 of the incorrect rack bay 10. The control then comprises a transmission of load sensor data of the load sensor 120 associated with the incorrect rack bay 10 to the control unit 130 and a transmission of control data from the control unit to the display unit 160 associated with the incorrect rack bay 10 to initiate a transmission of a second light signal by the display unit 160 associated with the incorrect rack bay 10.

If the stock material unit 4 to be placed is subsequently placed from the incorrect rack bay 10 into the destination rack bay, the control comprises a transmission of corresponding load sensor data from the load sensor 120 of the destination rack bay to the control unit 130. The control thereupon comprises a transmission of control data to the display unit 160 of the destination rack bay to end the transmission of the first light signal and a transmission of control data to the display unit 160 of the incorrect rack bay 10 to end a transmission of the second light signal.

Figure 3:
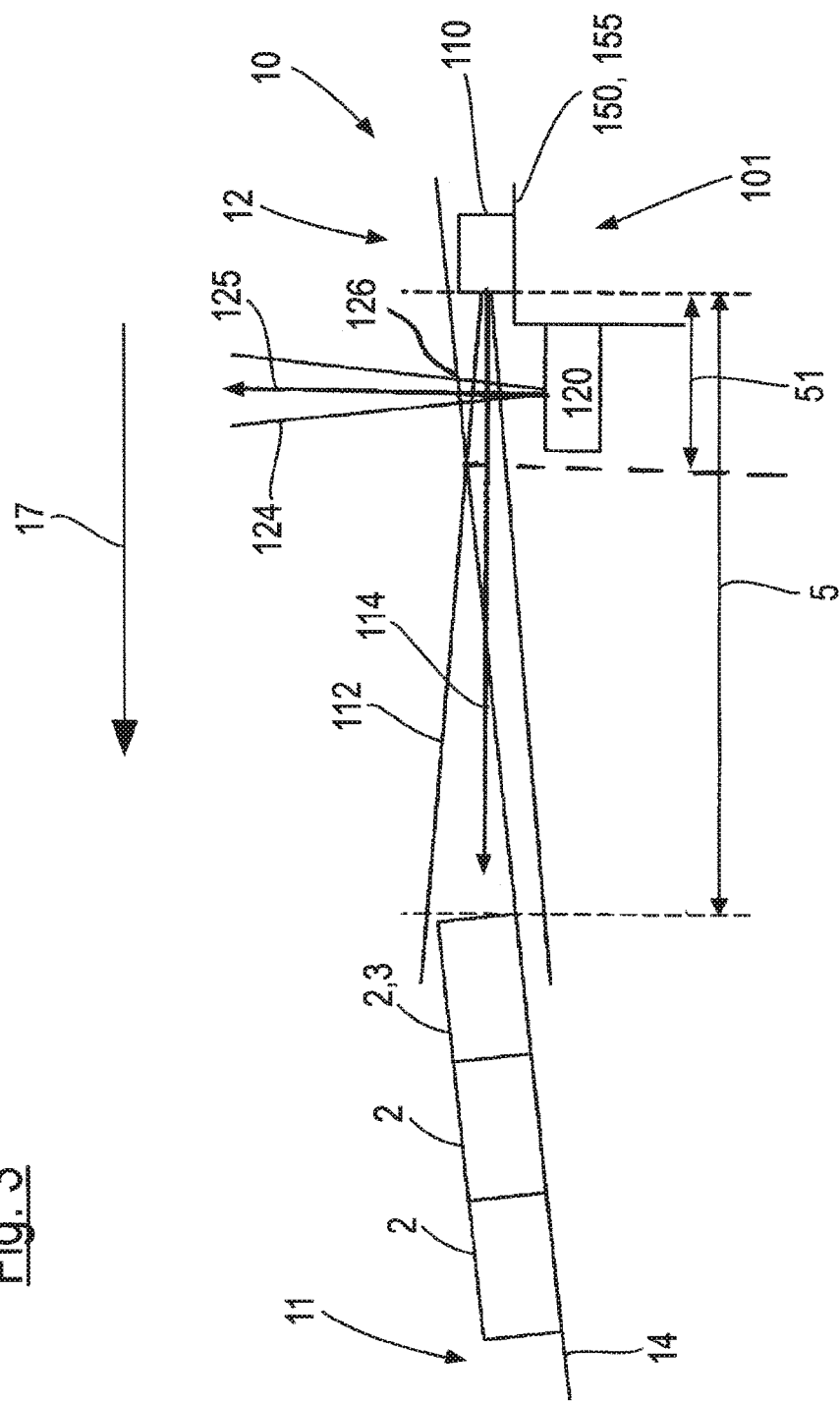
FIG. 3 a rack bay of the flow rack unit with an occupancy sensor and a load sensor.

FIG. 3 shows one of the rack bays 10 of the flow rack unit 1 with the associated occupancy sensor 110 and the associated load sensor 120 of the sensor arrangement 101. The occupancy sensor 110 and the load sensor 120 are arranged below the rack level 14 of the rack bay 10 at a common holder 155 of a holding apparatus 150. The measurement zone 112 of the occupancy sensor 110 intersects the rack level 14 between the removal side 11 and the storage side 12. The occupancy sensor 110 is configured to detect a distance 5 from the rearmost stock material unit 3.

An intersection between the measurement zone 112 of the occupancy sensor 110 and the rack level 14 in which the measurement zone 112 contacts the rack level 14 in the longitudinal direction 17 starting from the occupancy sensor 110 defines a minimal distance 51 by which the rearmost stock material unit 3 has to be arranged at least spaced apart from the occupancy sensor 110 so that its distance 5 can be detected by the occupancy sensor 110. The measurement zone 112 of the occupancy sensor 110 is arranged symmetrically about a measurement axis 114 of the occupancy sensor 110 and the measurement zone 124 of the load sensor 120 is arranged symmetrically about a measurement axis 125 of the load sensor 120.

In an alternative embodiment, not shown, of the flow rack unit 1, the sensor arrangement 101 can also only comprise the occupancy sensor 110 and not additionally also the load sensor 120. In this respect, the detection zone 112 of the occupancy sensor 110 can be aligned such that it intersects the rack level 14 before an intersection point 126, with the intersection point 126 in the embodiment shown in FIG. 3 being given by the intersection point closest to the storage side 12 between the rack level 14 and the measurement zone 124 of the load sensor 120. The intersection point 126 defines a start of a placement zone of the rack bay 10 starting from the storage side 12. In said alternative embodiment, the zone 51 is therefore shorter than the distance from the intersection point 126 and the occupancy sensor 110 so that the load sensor 120 can be dispensable The angle of engagement of the occupancy sensor 110 to the rack level 14 could optionally also be selected as larger for this purpose.

Figure 4:
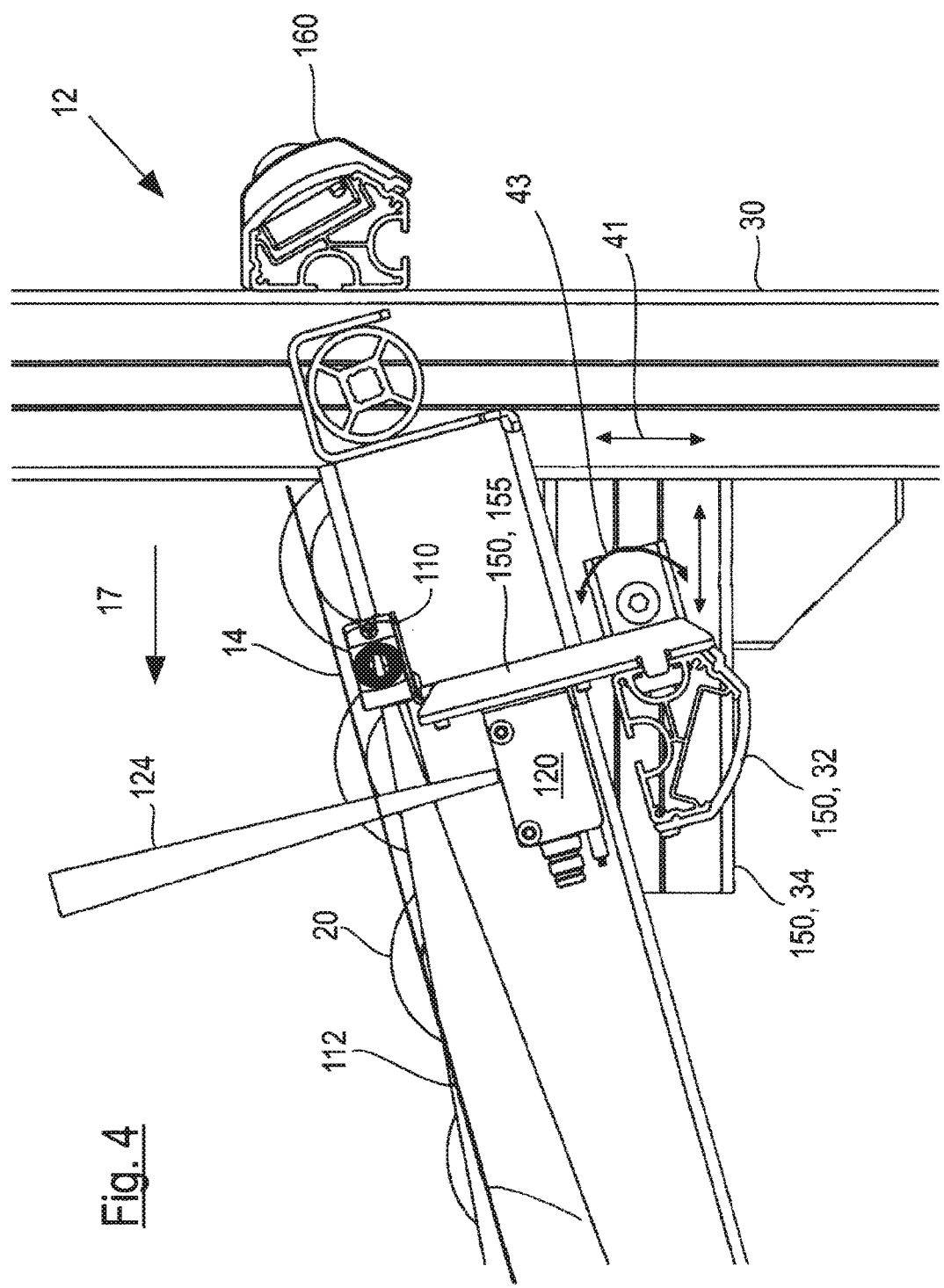
FIG. 4 a side view of a storage zone of the rack bay with a holding apparatus for the occupancy sensor and for the load sensor.
Figure 5:
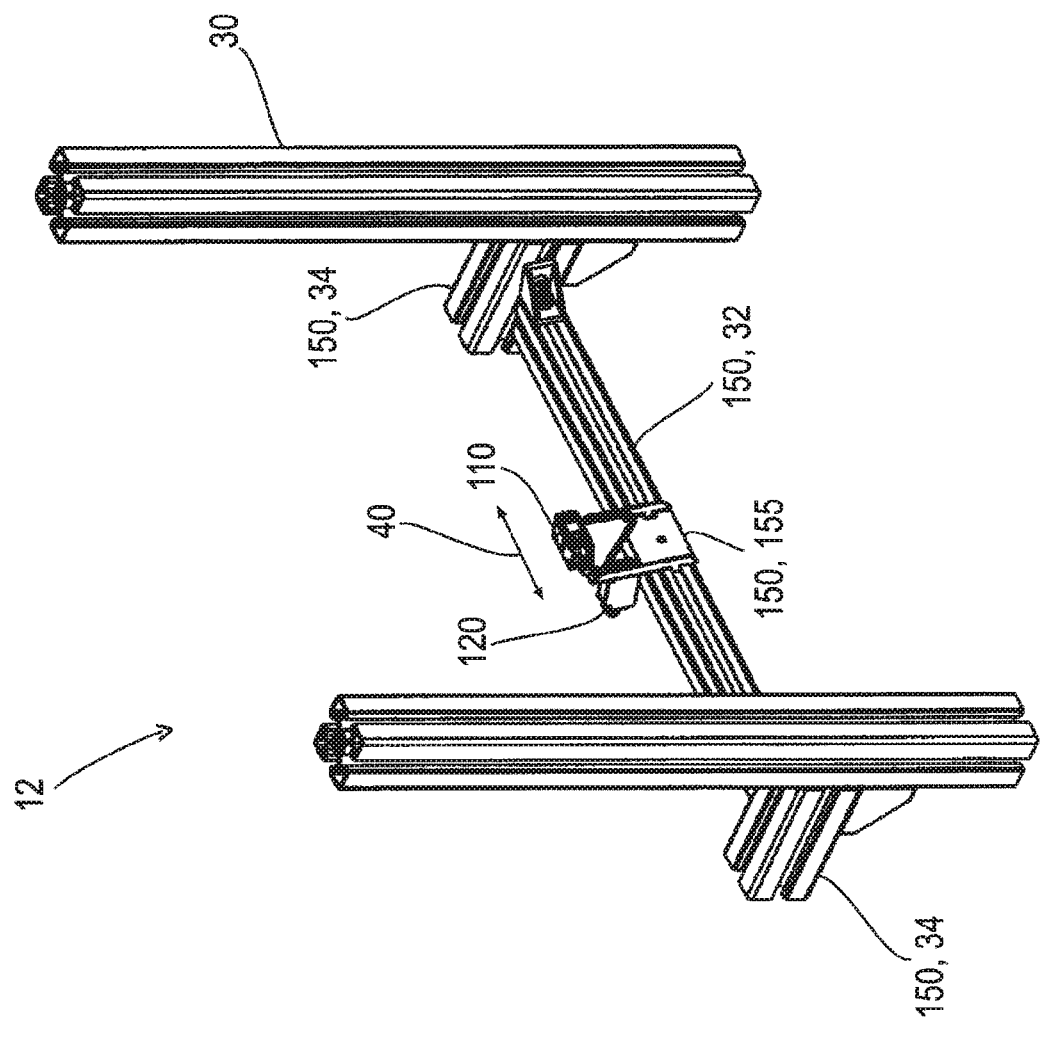
FIG. 5 a further view of the storage zone of the rack bay with the holding apparatus.

FIG. 4 shows a side view and FIG. 5 shows a perspective view of the storage zone 12 of the rack bay 10 with the holding apparatus 150 for the load sensor 120 and for the occupancy sensor 110.

The holding apparatus 150 is arranged at a rack frame 30 of the flow rack 1 and comprises a cross member 32, two longitudinal members 34, and the holder 155 for the occupancy sensor 110 and for the load sensor 120. The cross member 32 and the longitudinal members are each configured as sections, preferably as grooved sections, elongate in a longitudinal member direction. The holder 155 is configured as a one-part bent sheet metal part.

The longitudinal members 34 are arranged on respective oppositely disposed sides of the rack bay 10. The longitudinal member direction of the longitudinal members 34 is aligned in parallel with the longitudinal direction 17 of the rack bay 10. The longitudinal member direction of the cross member 32 is aligned along a transverse direction 40 oriented in parallel with the rack level 14 and perpendicular to the longitudinal direction 17. The cross member 32 is respectively connected at its two ends to one of the longitudinal members 34 rotatably in a direction of inclination 43 and displaceably in the longitudinal direction 17. A transverse axis about which the cross member 32 is rotatably arranged extends in parallel with the transverse direction 40. The cross member 32 is preferably connected at its two ends in each case with grooves of the longitudinal member 34 extending along the longitudinal direction.

The longitudinal members 34 are each displaceably connected to the rack frame 30 in a vertical direction 41 oriented perpendicular to the longitudinal direction 17 and perpendicular to the transverse direction 40. The longitudinal members 34 are preferably connected to a groove of the rack frame 30 extending in the vertical direction 41. The holder 155 is connected to the cross member 32 displaceably in the transverse direction 40, preferably to a groove of the cross member 32 extending in the transverse direction 40. The holder 155 is thus arranged displaceably in the vertical direction 41 and in the transverse direction 40 and rotatably about the transverse direction 40 at the flow rack unit 1.

As is shown in FIG. 4, the rack bay 10 comprises transport means 20 to transport the stock material units 2 from the storage side 12 to the removal side 11. The transport means 20 are configured as rollers arranged along the rack bay 10.

Figure 6:
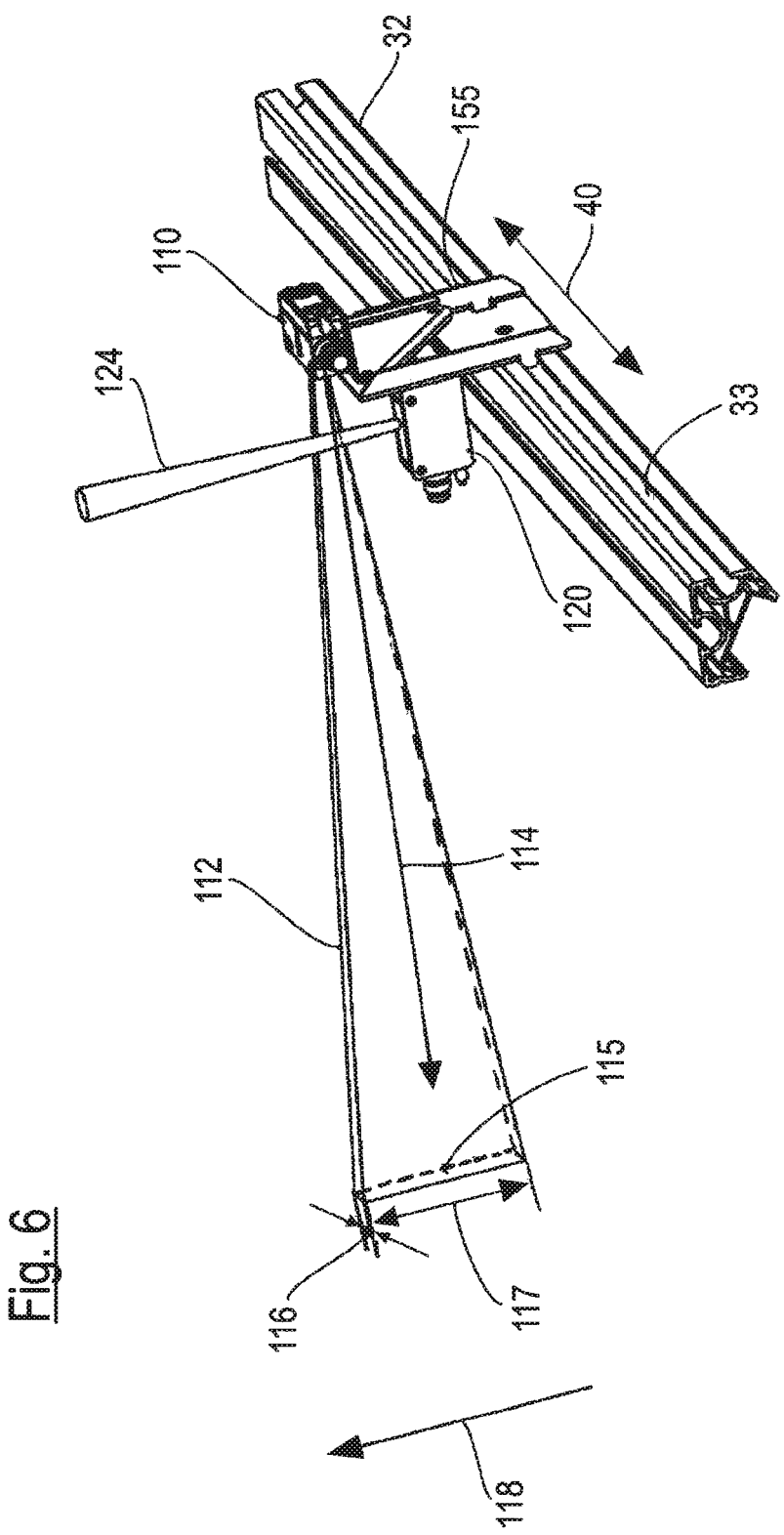
FIG. 6 a cross member and a holder of the holding apparatus.

FIG. 6 shows the cross member 32 with the holder 155, the occupancy sensor 110, and the load sensor 120. The holder 155 is fastened to a groove of the cross member 32 that extends in the transverse direction 40 and that forms a transverse guide 33 for the holder 155.

In addition, the measurement zone 112 of the occupancy sensor 110 is shown in FIG. 6. The measurement zone 112 is configured in a linear manner in a vertical direction 118 oriented perpendicular to the rack level 14. The measurement zone 112 of the occupancy sensor 110 has a cross-sectional area 115 perpendicular to the measurement direction 114 of the occupancy sensor 110, with the height 117 of said cross-sectional area 115 oriented in the vertical direction 118 being larger than its width 116 perpendicular to the vertical direction 118. The height 117 can, for example, be five times, preferably ten times, preferably a hundred times, greater than the width 116.

Figure 7:
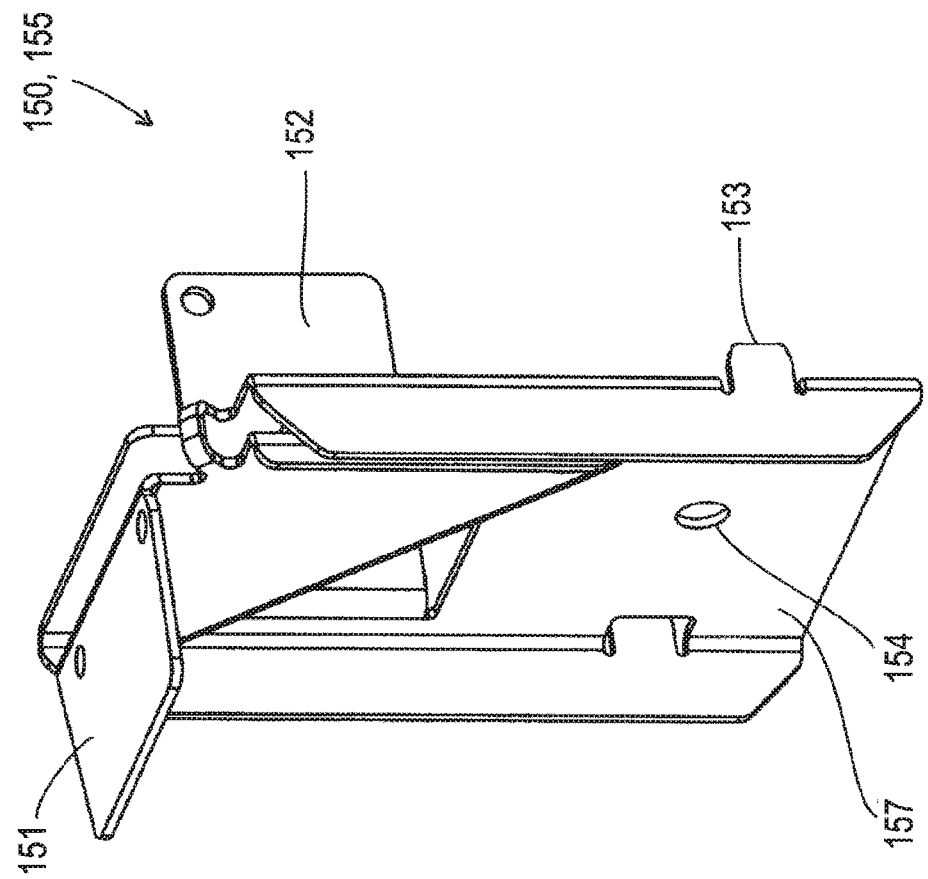
FIG. 7 the holder of the holding apparatus.

FIG. 7 shows the holder 155 of the holding apparatus 150. The holder 155 comprises a contact part 157 that is configured as a planar sheet metal section and that contacts the cross member 32 not shown in FIG. 7. A fastening element 154 for fastening the holder 155 to the cross member 32 is formed in the contact part 157. The fastening element 154 is designed as a passage bore for receiving a screw in the contact part 157. Two transverse guide element 115 oriented perpendicular to the plane of the contact part 157 are formed at the contact part 157 and engage into the transverse guide 33 of the cross member 32.

An occupancy sensor mount 151 and a load sensor mount 152 are additionally formed at the contact part 157. The occupancy sensor mount 151 and the load sensor mount 152 are each formed as planar sheet metal sections. The occupancy sensor mount 151 is oriented perpendicular to the load sensor mount 152. The occupancy sensor mount 151 and the load sensor mount 152 are each oriented perpendicular to the contact part 157. The occupancy sensor mount 151 is oriented in parallel with the transverse direction 40 and the load sensor mount 152 is oriented perpendicular to the transverse direction 40.

REFERENCE NUMERAL LIST 1 flow rack unit
2 stock material unit
3 rearmost stock material unit
4 stock material unit to be placed
5 distance
9 code
10 rack bay
11 removal side
12 storage side
14 rack level
16 return rack
17 longitudinal direction
20 transport means
30 rack frame
32 cross member
33 transverse guide
34 longitudinal member
40 transverse direction
41 vertical direction
43 inclination direction
51 minimum distance
100 control system
101 sensor arrangement
102 data line
103 further data line
110 occupancy sensor
112 measurement zone of the occupancy sensor
114 measurement axis of the occupancy sensor
115 cross-sectional area
116 width
117 height
118 vertical direction
120 load sensor
122 sensor signal
124 measurement zone of the load sensor
125 measurement axis of the load sensor
126 intersection point
130 control unit
132 processing unit
134 length information
136 association data
140 identification unit
141 communication line
150 holding apparatus
151 occupancy sensor mount
152 load sensor mount
153 transverse guide element
154 fastening element
155 holder
157 contact part
160 display unit
170 monitoring unit
127 master module

The invention claimed is:

1. A flow rack unit for providing stock material units, comprising:
the flow rack unit having at least two rack bays and one control system,
the rack bays each having a removal side and a storage side disposed opposite the removal side, wherein the rack bays are configured to provide the stock material units respectively in a rack level, starting from the removal side, after one another in the direction of the storage side;
a respective sensor arrangement of the control system associated with each rack bay;
the sensor arrangements each arranged at the storage side of the associated rack bay, the sensor arrangements connected to a control unit of the control system via a common data line; and
the sensor arrangements each comprise an occupancy sensor configured as a distance sensor, wherein each occupancy sensor has a measurement zone that is aligned from the storage side of the associated rack bay in the direction of the removal side of the associated rack bay to measure a distance from a rearmost stock material stored in the associated rack bay and disposed next to the occupancy sensor, wherein each occupancy sensor is configured to transmit distance data representing the measured distance via the data line to the control unit to detect a number of stock material units stored in the rack bays in the control unit;
wherein the sensor arrangements each further comprise a load sensor that is configured to detect the placement of the stock material unit at the storage side of the associated rack bay and to transmit sensor data indicating the placement of the stock material unit at the storage side via the data line to the control unit,
wherein the load sensors and the occupancy sensors are connected to the common data line,
and wherein the occupancy sensors and the load sensors of the individual rack bays are each connected to the data line before or after the occupancy sensors and the load sensors of adjacent rack bays.

2. The flow rack unit according to claim 1,
wherein the sensor arrangements are connected in series via the data line.

3. The flow rack unit according to claim 1,
wherein the occupancy sensors are configured to measure the distances by means of the time of flight principle.

4. The flow rack unit according to claim 1,
wherein a respective display unit is associated with the rack bays; and
wherein the control unit is configured to transmit control data for the display units via the data line to mark one of the rack bays as a destination rack bay for the stock material unit to be placed.

5. The flow rack unit according to claim 1,
wherein the control system has an identification unit;
wherein the identification unit is configured to detect a code of the stock material unit to be placed in a destination rack bay and to transmit it to the control unit; and
wherein the control unit is configured to determine the destination rack bay for the stock material unit to be placed with reference to the code.

6. The flow rack unit according to claim 1,
wherein the occupancy sensors of the individual rack bays are each arranged below the rack level of the respective rack bay and the measurement zones of the occupancy sensors of the individual rack bays each intersect the rack level of the respective rack bay between the storage side and the removal side.

7. The flow rack unit according to claim 1,
wherein the measurement zones of the occupancy sensors of the individual rack bays are configured in a linear manner in a vertical direction oriented perpendicular to the rack level of the respective rack bay.

8. The flow rack unit according to claim 1,
wherein a first length of first stock material units is stored in the control unit;
wherein a second length of second stock material units is stored in the control unit; and
wherein the control unit is configured to determine the number of stock material units stored in the rack bays by determining one of the first length and the second length based on an identification signal supplied to the control unit for identifying the stock material unit to be placed.

9. The flow rack unit according to claim 1,
wherein the control system comprises a monitoring unit;
wherein the monitoring unit is connected to sensor arrangements via the data line;
wherein the monitoring unit is connected to the control unit via a further data line;
wherein the monitoring unit comprises a master module for controlling a data transmission over the data line; and
wherein the sensor arrangements are connected to the data line as slave units controlled by the master module.

10. A flow rack unit for providing stock material units, comprising:
the flow rack unit having at least two rack bays and one control system,
the rack bays each having a removal side and a storage side disposed opposite the removal side, wherein the rack bays are configured to provide the stock material units respectively in a rack level, starting from the removal side, after one another in the direction of the storage side;
a respective sensor arrangement of the control system associated with each rack bay;
the sensor arrangements each arranged at the storage side of the associated rack bay, the sensor arrangements connected to a control unit of the control system via a common data line; and
the sensor arrangements each comprise an occupancy sensor configured as a distance sensor, wherein each occupancy sensor has a measurement zone that is aligned from the storage side of the associated rack bay in the direction of the removal side of the associated rack bay to measure a distance from a rearmost stock material stored in the associated rack bay and disposed next to the occupancy sensor, wherein each occupancy sensor is configured to transmit distance data representing the measured distance via the data line to the control unit to detect a number of stock material units stored in the rack bays in the control unit;
wherein the sensor arrangements each further comprise a load sensor that is configured to detect the placement of the stock material unit at the storage side of the associated rack bay and to transmit sensor data indicating the placement of the stock material unit at the storage side via the data line to the control unit,
wherein the load sensors and the occupancy sensors are connected to the common data line,
and wherein the occupancy sensors and the load sensors of the individual rack bays are each arranged at a common holder.

11. The flow rack unit according to claim 10,
wherein the holders are each configured as one-part bent sheet metal parts.

12. The flow rack unit according to claim 10,
wherein the occupancy sensors are configured to measure the distances by means of the time of flight principle.

13. A control system for a flow rack unit for providing stock material units in at least two rack bays;
wherein the control system comprises at least two sensor arrangements and one control unit;
wherein the sensor arrangements are connected to the control unit via a common data line;
wherein the sensor arrangements each comprise an occupancy sensor configured as a distance sensor;
wherein the occupancy sensors are configured to be respectively associated with one of the rack bays and to be arranged at a storage side of the associated rack bay such that a measurement zone of the respective occupancy sensor is aligned from the storage side of the rack bay in the direction of a removal side of the rack bay disposed opposite the storage side to measure a distance from a rearmost stock material unit stored in the associated rack bay and closest to the occupancy sensor;
wherein each occupancy sensor is configured to transmit distance data representing the measured distance via the data line to the control unit to detect a number of stock material units stored in the rack bays in the control unit;
wherein the sensor arrangements each further comprise a load sensor that is configured to detect the placement of the stock material unit at the storage side of the associated rack bay and to transmit sensor data indicating the placement via the data line to the control unit;
wherein the load sensors and the occupancy sensors are connected to the common data line;
and wherein the occupancy sensors and the load sensors of the individual rack bays are each connected to the data line before or after the occupancy sensors and the load sensors of adjacent rack bays.

14. The control system according to claim 13,
wherein the occupancy sensors measure the distances by means of the time of flight principle.

15. A method for using at least two distance sensors as occupancy sensors of a control system for a flow rack unit that provides stock material units in at least two rack bays,
wherein the distance sensors are each associated with one of the rack bays and are arranged at a storage side of the associated rack bay such that measurement zones of the distance sensors are aligned from the storage side of the associated rack bay in the direction of a removal side of the associated rack bay disposed opposite the storage side;
wherein a respective distance from a rearmost stock material unit stored in the rack bay associated with the respective distance sensor and disposed closest to the respective distance sensor is measured by means of the distance sensors;
wherein the distance sensors are connected via a common data line of a control unit of the control system;
wherein distance data representing the measured distances are transmitted by the distance sensors via the data line to the control unit to detect a number of stock material units arranged in the rack bays in the control unit;

wherein a load sensor at the storage side of each of the associated rack bay configured to detect the placement of the stock material unit at the storage side of the associated rack bay;

wherein sensor data are transmitted via the data line to the control unit to control a placement of the stock material units in the rack bays;

wherein the load sensors and the occupancy sensors are connected to the common data line;

and wherein the occupancy sensors and the load sensors of the individual rack bays are each connected to the data line before or after the occupancy sensors and the load sensors of adjacent rack bays.

16. The method of claim 15, wherein the occupancy sensors measure the distances by means of the time of flight principle.

17. A control system for a flow rack unit for providing stock material units in at least two rack bays;

wherein the control system comprises at least two sensor arrangements and one control unit;

wherein the sensor arrangements are connected to the control unit via a common data line;

wherein the sensor arrangements each comprise an occupancy sensor configured as a distance sensor;

wherein the occupancy sensors are configured to be respectively associated with one of the rack bays and to be arranged at a storage side of the associated rack bay such that a measurement zone of the respective occupancy sensor is aligned from the storage side of the rack bay in the direction of a removal side of the rack bay disposed opposite the storage side to measure a distance from a rearmost stock material unit stored in the associated rack bay and closest to the occupancy sensor;

wherein each occupancy sensor is configured to transmit distance data representing the measured distance via the data line to the control unit to detect a number of stock material units stored in the rack bays in the control unit;

wherein the sensor arrangements each further comprise a load sensor that is configured to detect the placement of the stock material unit at the storage side of the associated rack bay and to transmit sensor data indicating the placement via the data line to the control unit;

wherein the load sensors and the occupancy sensors are connected to the common data line;

and wherein the occupancy sensors and the load sensors of the individual rack bays are each arranged at a common holder.

18. The control system according to claim 17, wherein the occupancy sensors are configured to measure the distances by means of the time of flight principle.

19. A method for using at least two distance sensors as occupancy sensors of a control system for a flow rack unit that provides stock material units in at least two rack bays, wherein the distance sensors are each associated with one of the rack bays and are arranged at a storage side of the associated rack bay such that measurement zones of the distance sensors are aligned from the storage side of the associated rack bay in the direction of a removal side of the associated rack bay disposed opposite the storage side;

wherein a respective distance from a rearmost stock material unit stored in the rack bay associated with the respective distance sensor and disposed closest to the respective distance sensor is measured by means of the distance sensors;

wherein the distance sensors are connected via a common data line of a control unit of the control system;

wherein distance data representing the measured distances are transmitted by the distance sensors via the data line to the control unit to detect a number of stock material units arranged in the rack bays in the control unit;

wherein a load sensor at the storage side of each of the associated rack bay is configured to detect the placement of the stock material unit at the storage side of the associated rack bay;

wherein sensor data are transmitted via the data line to the control unit to control a placement of the stock material units in the rack bays;

wherein the load sensors and the occupancy sensors are connected to the common data line;

and wherein the occupancy sensors and the load sensors of the individual rack bays are each arranged at a common holder.

20. The method of claim 19, wherein the occupancy sensors measure the distances by means of the time of flight principle.

* * * * *